H. GRAF.
MACHINE FOR MAKING SHEET METAL SCREW CAPS.
APPLICATION FILED APR. 21, 1911.

1,070,682.

Patented Aug. 19, 1913.

4 SHEETS—SHEET 1.

Witnesses

Inventor:
Henry Graf
By Munday, Evarts, Adcock & Clarke
Attys

H. GRAF.
MACHINE FOR MAKING SHEET METAL SCREW CAPS.
APPLICATION FILED APR. 21, 1911.

1,070,682.

Patented Aug. 19, 1913.

4 SHEETS—SHEET 2.

H. GRAF.
MACHINE FOR MAKING SHEET METAL SCREW CAPS.
APPLICATION FILED APR. 21, 1911.

1,070,682.

Patented Aug. 19, 1913.

4 SHEETS—SHEET 3.

Witnesses:

Inventor
Henry Graf
By Munday, Evarts, Adcock & Clarke,
Attys.

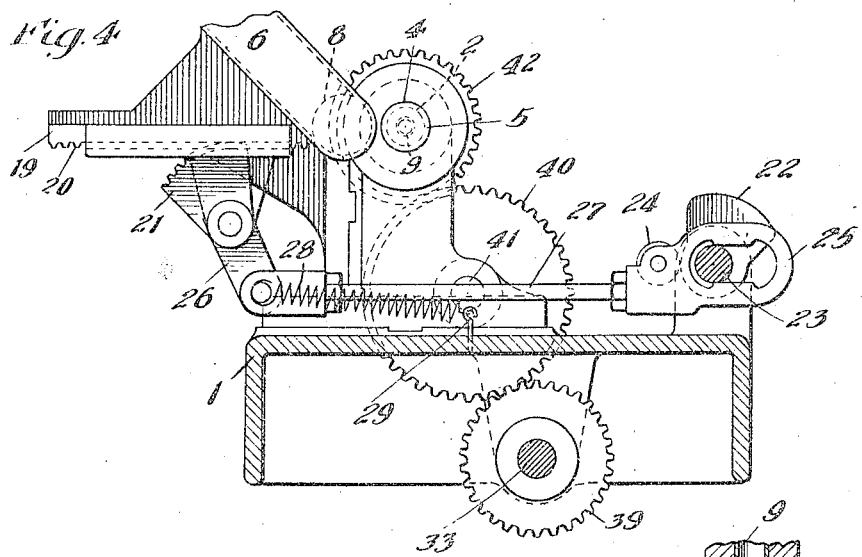

UNITED STATES PATENT OFFICE.

HENRY GRAF, OF TOLEDO, OHIO, ASSIGNOR TO AMERICAN CAN COMPANY, OF NEW YORK, N. Y., A CORPORATION OF NEW JERSEY.

MACHINE FOR MAKING SHEET-METAL SCREW-CAPS.

1,070,682. Specification of Letters Patent. Patented Aug. 19, 1913.

Application filed April 21, 1911. Serial No. 622,499.

*To all whom it may concern:*

Be it known that I, HENRY GRAF, a citizen of the United States, residing in Toledo, in the county of Lucas and State of Ohio, have invented a new and useful Improvement in Machines for Making Sheet-Metal Screw-Caps, of which the following is a specification.

My invention relates to improvements in machines for making sheet metal screw caps, such as are used for closing fruit jars and other vessels.

The object of my invention is to provide an improved construction of screw cap machine by means of which the sheet metal caps may be rapidly and conveniently fed to the screw threading devices and screw threaded and discharged from the machine.

My invention consists in the novel construction of parts and devices and in the novel combinations of parts and devices herein shown and described by which this object or result is practically accomplished, the same being more particularly specified in the claims.

Figure 1:
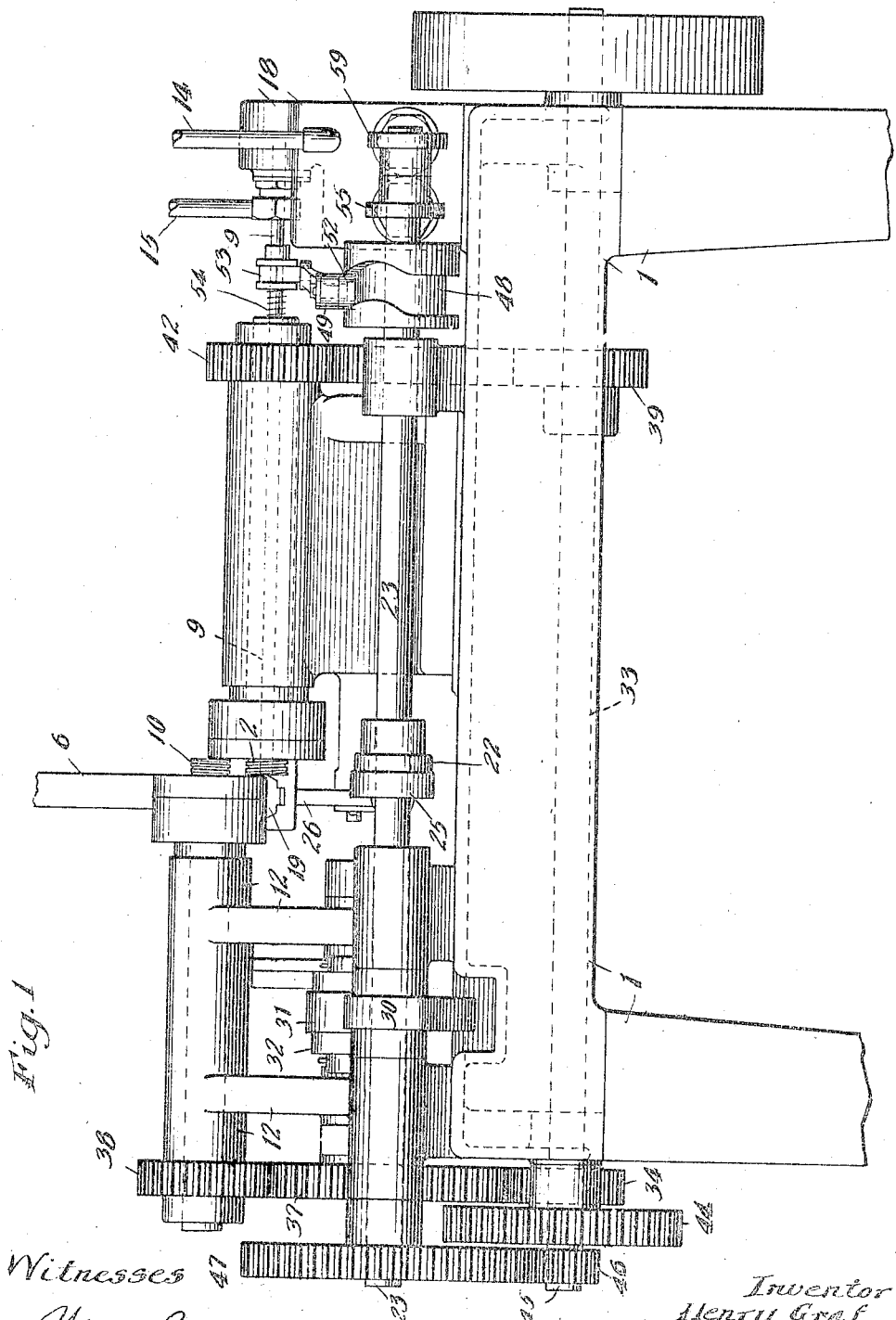
Figure 2:
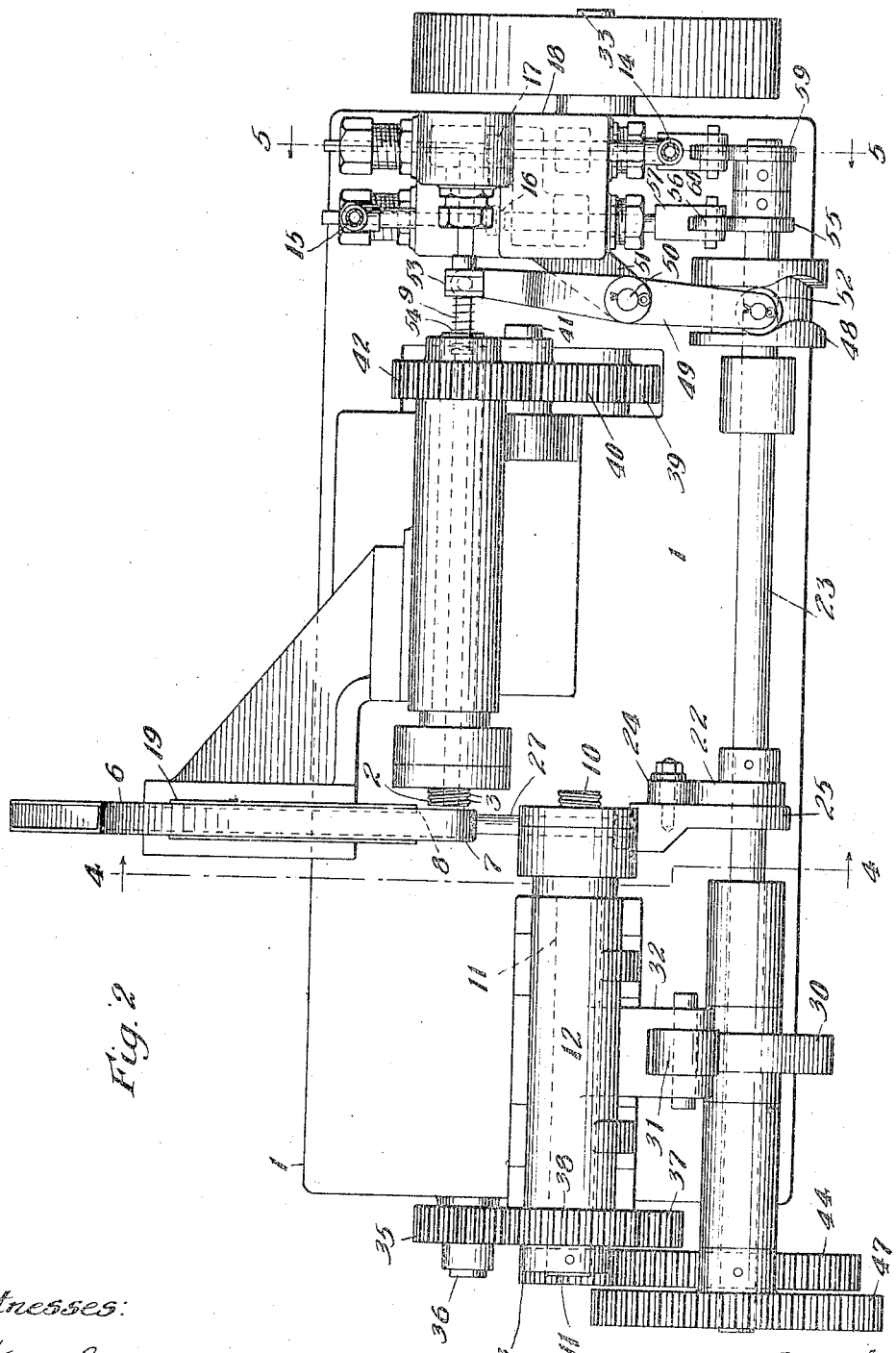
Figure 3:
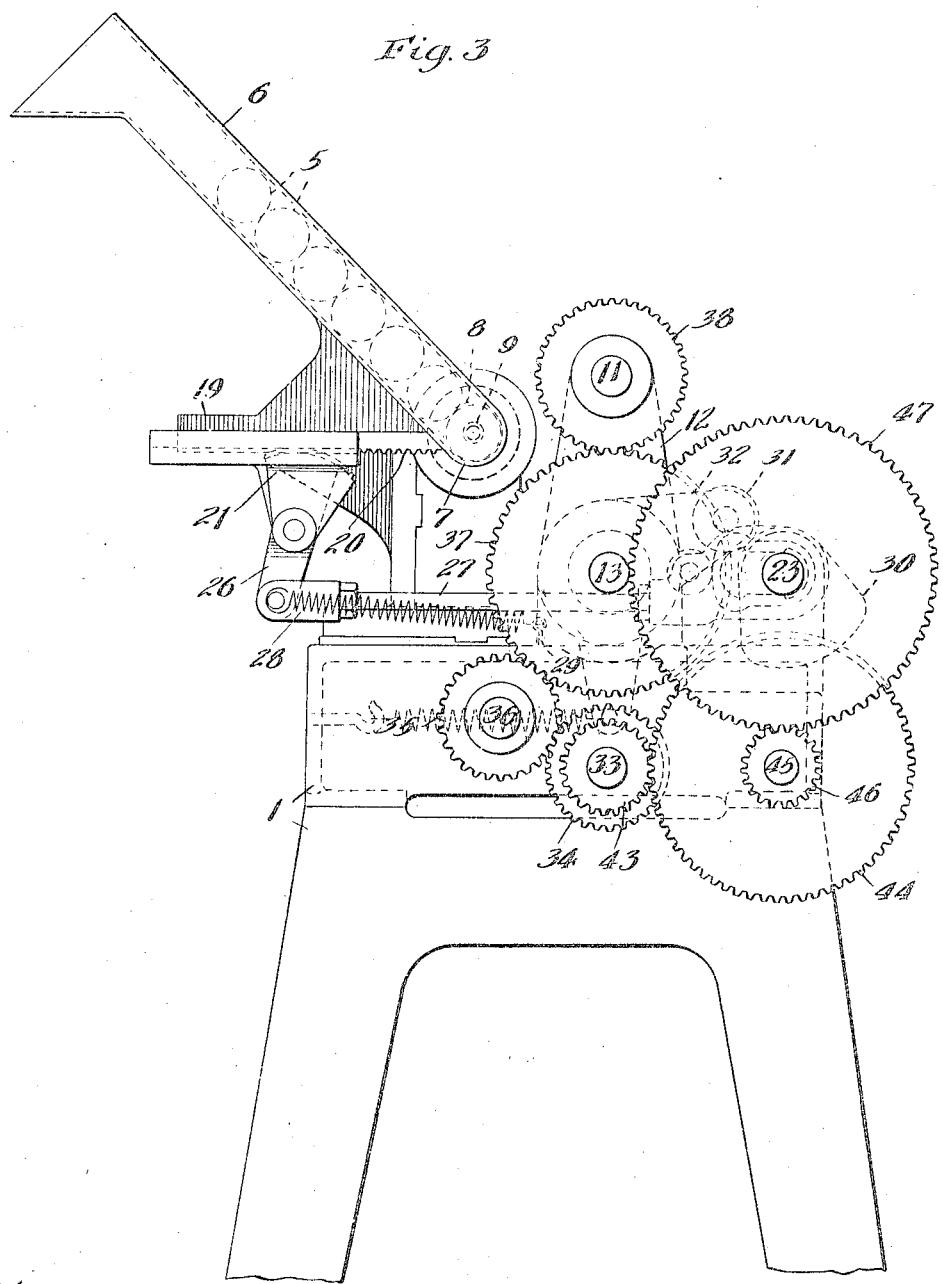

In the accompanying drawing forming a part of this specification, Figure 1 is a side elevation of a screw cap machine embodying my invention. Fig. 2 is a plan view. Fig. 3 is an end elevation. Fig. 4 is a detail, vertical, cross section on line 4—4 of Fig. 2. Fig. 5 is a detail section on line 5—5 of Fig. 2 and Fig. 6 is a detail view, partly in section, illustrating the operation of the mandrel and threading tool.

In the drawing, 1 represents the frame of the machine, 2 a rotary cap holding mandrel having screw threads 3 at its end portion conforming to those desired to be formed upon the cylindrical or peripheral wall 4 of the sheet metal cap 5.

The caps 5 to be screw threaded feed down by gravity through a cap chute 6, which is normally in registry at its closed lower end 7 with the front end of the cap holding mandrel 2, but which is adapted to be retracted or withdrawn out of the way to permit the discharge of the finished or screw threaded cap from the mandrel. The feed chute 6 is arranged sufficiently upright to permit the caps to feed down by gravity and is provided on the side or face thereof adjacent to the cap holding mandrel 2 with an opening 8 to permit the lowermost cap to be withdrawn from the chute onto the mandrel by operation of the suction feed and compressed air discharging pipe 9 which is inside and is adapted to be reciprocated in the cap holding mandrel 2.

The cylindrical or peripheral wall 4 of the cap 5 is screw threaded by a rotary threading tool or roller 10, the shaft or spindle 11 of which is journaled on a movable, preferably a swinging, support or arm 12 which is pivoted to the frame at 13 and moved back and forth as required to bring the threading tool or roller 10 into engagement with the cap holding mandrel at intervals as required.

The suction and compressed air cap feeding and discharging pipe 9 is connected alternately with a vacuum or suction pipe 14 and a compressed air pipe 15 by means of a suction valve 16 and a compressed air valve 17, both preferably mounted in a single valve shell 18.

To effect the feed or withdrawal of the lowermost cap 5 from the cap feed chute 6 and deliver it onto the cap holding mandrel 2, the suction and compressed air pipe 9 is first moved forward into such lowermost cap so that the end of the pipe is in close proximity with the bottom, top or flat or disk portion of the cap. The suction valve is then opened and the pipe 9 is then withdrawn, the air suction or vacuum causing the cap to withdraw with the pipe and telescope itself over the projecting front end of the cap holder mandrel 2. The threading tool or roller 10 is then moved up into engagement with the cap on the mandrel, and as the cap and mandrel continuously rotate, the cylindrical or peripheral wall of the cap is formed with screw threads thereon. Simultaneously with this movement, the feed chute is withdrawn out of the way to permit the discharge of the now screw threaded cap and the vacuum valve is closed. The threading tool or roller 10 is then swung back into its original position and the compressed air valve is opened, and the finished cap, which fits loosely on the cap holder mandrel, is ejected or discharged by the compressed air admitted through the suction and compressed air pipe 9. After the discharge of the finished cap, the feed chute is again advanced into position to bring its lower end and the lowermost cap therein into registry with the cap holder mandrel and the compressed air valve is closed and the air pipe 9 is again advanced, and the suction valve opened, and the operation continued.

Any suitable means may be employed to impart to the several operating devices of my improved machine their required motions or movements; that which I prefer to employ is illustrated in the drawing, and may be briefly described as follows: The movable cap feed chute 6 is preferably given its required movements by a reciprocating slide 19, preferably furnished with a rack 20 which engages a segment gear 21 which is oscillated by a cam 22 on the cam shaft 23 which engages an anti-friction roller 24 on the slotted link 25 which connects with the arm 26 of the segment gear through an adjustable member 27. A spring 28 connected to the frame at 29 at one end and at its other end to the arm 26 of the segment gear serves to hold the feed chute normally in its retracted position. The threading tool or roller 10 and its vibrating arm or support 12 are preferably vibrated by means of a cam 30 on the cam shaft 23 which engages an anti-friction roller 31 on the arm 32 of the vibrating support 12. The threading tool or roller 10 is preferably continuously rotated from the main driving shaft 33 through a gear 34 thereon which meshes with a gear 35 on the shaft 36, and which gear 35 meshes with a gear 37 on the shaft 13, said gear 37 meshing with a gear 38 on the shaft or spindle 11 of the threading tool 10.

The mandrel 2 or its shaft 102 is preferably continuously rotated as required from the driving shaft 33 through a gear 39 thereon, which meshes with a gear 40 on the shaft 41, said gear 40 meshing with a gear 42 on the mandrel shaft. The cam shaft 23 is preferably continuously rotated as required from the driving shaft 33 through a gear 43 thereon, which meshes with a gear 44 on the shaft 45 which carries a gear 46, which meshes with a gear 47 on the cam shaft. The air pipe 9 is preferably reciprocated as required within the mandrel 2 by means of a grooved cam 48 on the cam shaft 23, and a vibrating lever 49, pivoted at 50 to a bracket 51 on the frame of the machine, and which lever carries an anti-friction roller 52 to engage the cam, and connects at its other end with a collar 53 on the air pipe 9. A spring 54 surrounding the air pipe and bearing against the collar 53 tends to hold the air pipe in its retracted position. The suction valve 16 is preferably reciprocated as required to open and close the same by means of a cam 55 on the cam shaft 23, which engages an anti-friction roller 56 carried by the stem 57 of the suction valve, a spring 58 surrounding the valve stem serving to hold the vacuum or suction valve normally closed.

The compressed air valve 17 is preferably of the same construction as the suction valve 16 and operated in the same way by a cam 59 on the cam shaft 23 which engages an antifriction roller 60 on the compressed air valve stem. The valve stems of the suction and compressed air valves extend through suitable stuffing boxes, as will be readily understood from Fig. 5, which shows the stuffing boxes for the stem of the compression valve.

I claim:—

1. In a sheet metal cap threading machine, the combination with a cap holder mandrel adapted to engage the interior of the cap and a threading tool, of a cap feed chute having a closed lower end provided with an opening in the side thereof for withdrawal of the lowermost cap, and an air suction pipe inside the cap holder mandrel for withdrawing the lowermost cap from the chute onto the mandrel, substantially as specified.

2. In a sheet metal cap threading machine, the combination with a cap holder mandrel adapted to engage the interior of the cap and a threading tool, of a cap feed chute having a closed lower end provided with an opening in the side thereof for withdrawal of the lowermost cap, and a reciprocating air suction pipe inside the cap holder mandrel for withdrawing the lowermost cap from the chute onto the mandrel, substantially as specified.

3. In a sheet metal cap threading machine, the combination with a rotary screw threaded cap holding mandrel, of a movable rotary threading tool, a cap chute and a reciprocating air pipe for delivering the caps one by one from the chute to the mandrel, substantially as specified.

4. In a sheet metal cap threading machine, the combination with a rotary screw threaded cap holding mandrel, of a movable rotary threading tool, a cap chute and a reciprocating air pipe located within the mandrel for delivering the caps one by one from the chute to the mandrel and discharging the threaded caps from said mandrel, substantially as specified.

5. In a sheet metal cap threading machine, the combination with a rotary screw threaded cap holding mandrel, of a movable rotary threading tool, a cap chute and a reciprocating air pipe for delivering the caps one by one from the chute to the mandrel and discharging the threaded caps from said mandrel, said chute being movable to permit the discharge of the threaded cap from the mandrel, said pipe being connected to a source of supply of compressed air, substantially as specified.

6. In a sheet metal cap threading machine, the combination with a rotary screw threaded cap holding mandrel, of a movable rotary threading tool, a cap chute and a reciprocating air pipe for delivering the caps one by one from the chute to the mandrel and discharging the threaded caps from said mandrel, an air suction valve and a compressed air valve, substantially as specified.

7. The combination with a cap holder mandrel and a threading tool coöperating therewith, the one movable in respect to the other, of a movable cap holder chute and an air pipe to deliver the caps one by one from the chute onto the mandrel and to discharge them from the mandrel, said pipe being connected to means for exhausting air from the pipe, substantially as specified.

8. The combination with a cap holder mandrel and a threading tool coöperating therewith, the one movable in respect to the other, of a movable cap holder chute and an air pipe to deliver the caps one by one from the chute onto the mandrel and to discharge them from the mandrel, an air suction valve and a compressed air valve, substantially as specified.

9. The combination with a cap holder mandrel and a threading tool coöperating therewith, the one movable in respect to the other, of a movable cap holder chute and an air pipe to deliver the caps one by one from the chute onto the mandrel and to discharge them from the mandrel, and means for reciprocating said air pipe within the mandrel, substantially as specified.

HENRY GRAF.

Witnesses:
L. W. BREEDE,
JNO. BLANK.